United States Patent [19]

Fruend

[11] Patent Number: 5,439,171
[45] Date of Patent: Aug. 8, 1995

[54] TRACTION MAT FOR VEHICLES
[75] Inventor: Ian K. Fruend, Queensland, Australia
[73] Assignee: Kulak Technologies Pty. Ltd., Queensland, Australia
[21] Appl. No.: 198,403
[22] Filed: Feb. 22, 1994
[30] Foreign Application Priority Data
  Feb. 22, 1993 [AU] Australia ............... PL7430
[51] Int. Cl.6 ............................. B60B 39/12
[52] U.S. Cl. .................. 238/14; 152/208; D12/203
[58] Field of Search ............ 238/14; 180/7.1; 152/208; 404/35; 254/88; D12/154, 203
[56] References Cited
  U.S. PATENT DOCUMENTS
  1,159,657 11/1915 Dickinson ................. 238/14
  1,324,291 12/1919 Austen ..................... 238/14
  1,425,101 8/1922 Jury ........................ 238/14
  1,574,729 2/1926 Foster ..................... 238/14
  2,479,760 8/1949 Merrick ................... 238/14
  4,650,115 3/1987 Fontaine .................. 238/14

Primary Examiner—Michael W. Ball
Assistant Examiner—Francis J. Lorin
Attorney, Agent, or Firm—William H. Eilberg

[57] ABSTRACT

A traction mat for vehicles has panels of flexible resilient material interconnected by sets of overlapping links which enable the panels to be folded in a stacked arrangement.

Recesses or slots in the upper faces of the panels provide grip for a vehicle's tires and holes in the panel enable the panel to be pushed down through mud to a solid surface.

8 Claims, 3 Drawing Sheets

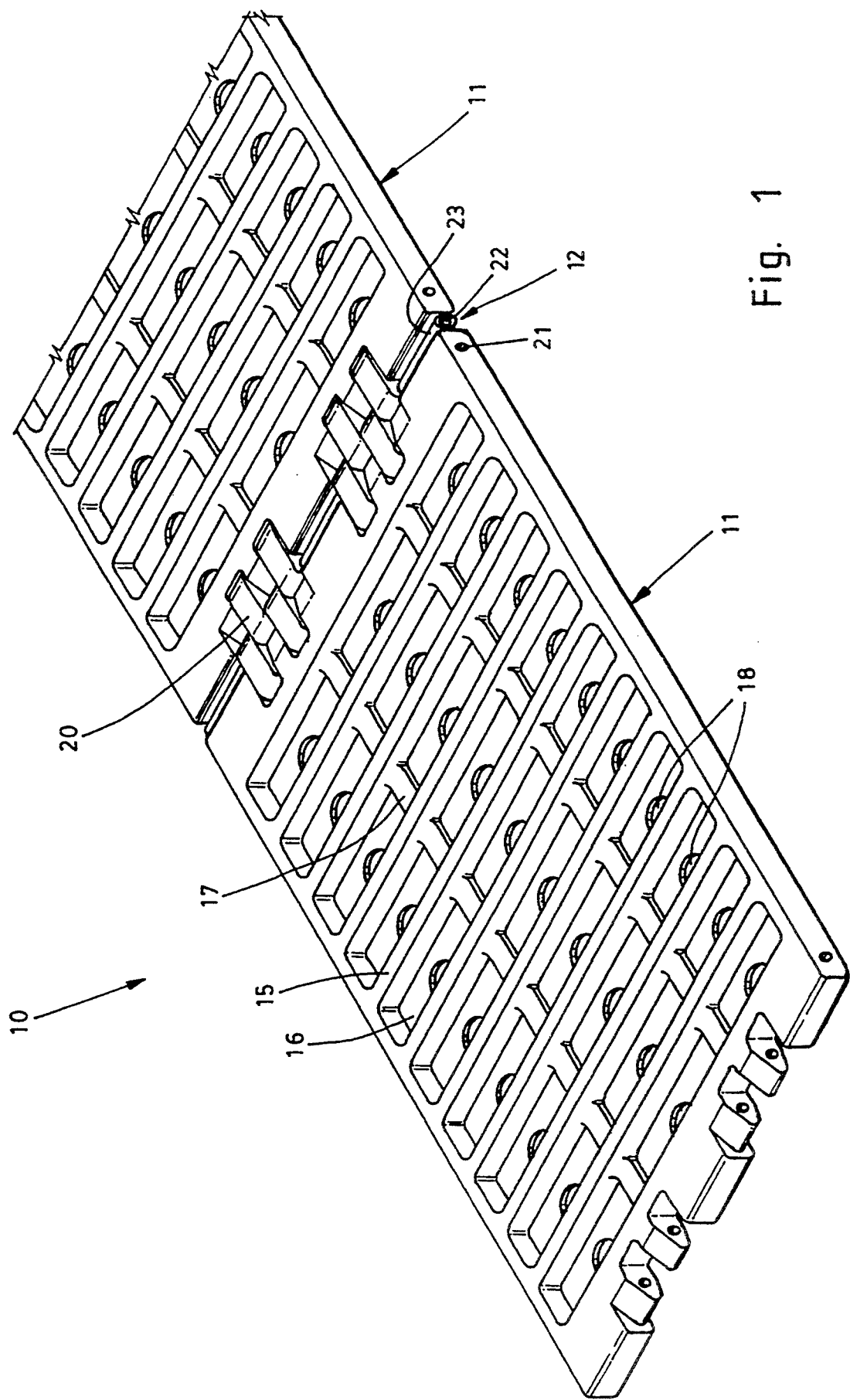

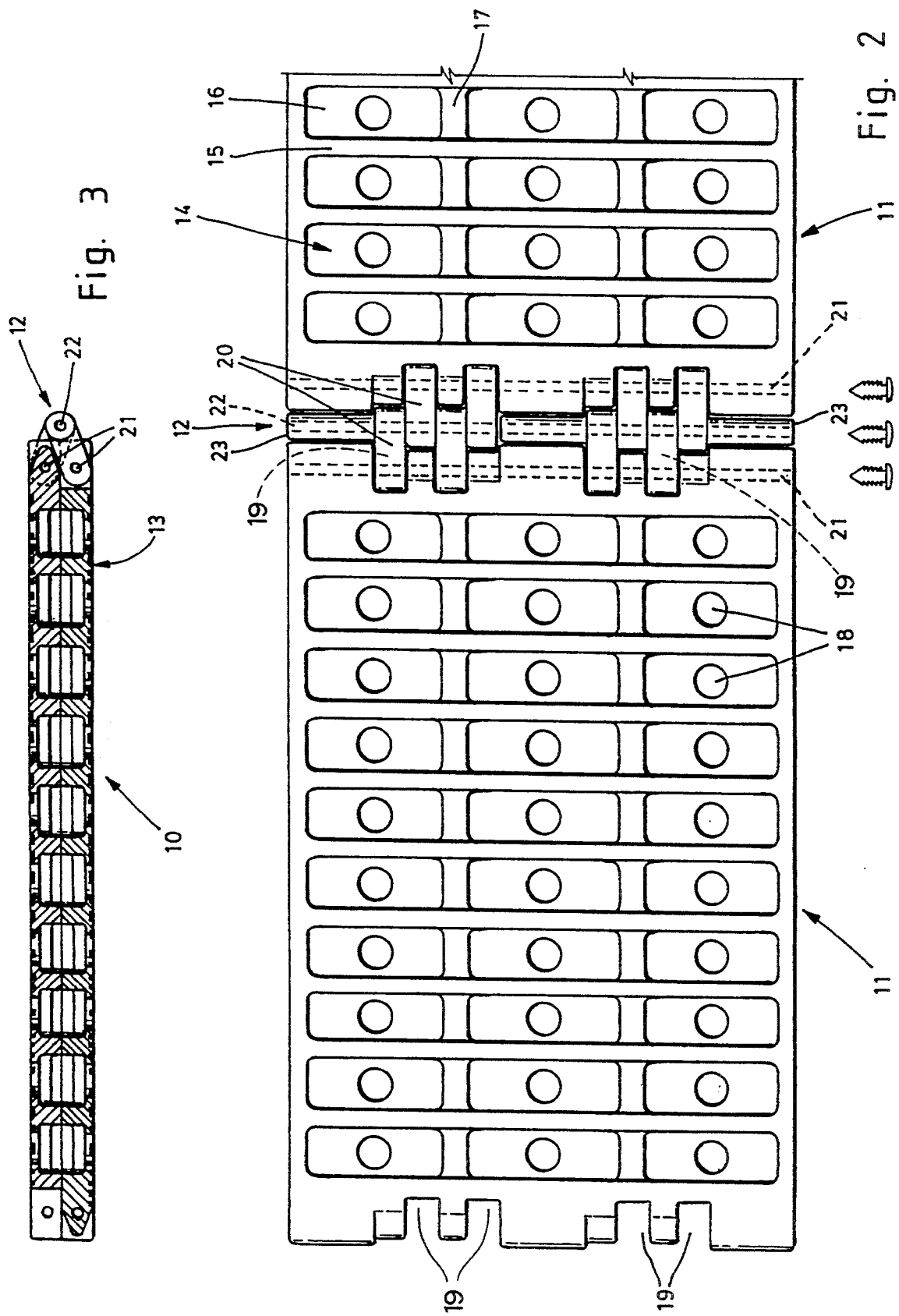

TRACTION MAT FOR VEHICLES

BACKGROUND OF THE INVENTION (1) Field of the Invention

THIS INVENTION relates to a traction mat for vehicles.

(2) Prior Art

With the increased sales of 4WD vehicles in recent years, the likelihood of inexperienced (and even experienced) drivers becoming bogged has increased.

Once a vehicle is bogged, it usually must be dug out and a temporary track, e.g. using tree branches, mats or the like, laid down to provide traction.

SUMMARY OF THE INVENTION

It is an object of the present invention to provide a traction mat which is simple to use.

It is a preferred object to provide a mat which is suitable for use in both mud and soft sand.

It is a further preferred object to provide a mat which can be compactly stored.

It is a still further preferred object to provide a mat which can be easily extended.

Other preferred objects will become apparent from the following description.

In a broad aspect, the present invention resides in a traction mat for vehicles including:

a plurality of substantially planar panels formed of flexible resilient material, each panel having an upper surface engageable by the vehicle's tires, a first set of slots open to one end of the panel and a second set of slots open to an opposite end of the panel, the first and second sets of slots being transversely offset;

a plurality of link means of flexible material, each link means hingedly interconnecting an adjacent pair of the panels and enabling the panels to be folded in a stacked arrangement, each link means having a body, a first set of links on the body receivable in the first set of slots on one of the panels and a second set of links on the body received in the second set of slots in a second of the panels; and hinge pin means to connect the first and second sets of links to the first and second panels respectively.

Preferably the flexible resilient material is an elastomer, e.g. semi-rigid polyurethane, which may be fibre-reinforced.

Preferably the upper surface of each panel has one or more recesses and/or slots to provide a gripping surface for the vehicle's tires;

a lower surface of each panel is at least partially patterned to provide gripping or non-slip contact with a support surface; and one or more holes are provided through the panels to prevent the panels from floating in water or mud.

Preferably the first and second sets of slots each include two pairs of spaced slots, the slots in each pair being associated with a pair of fingers which are terminated in a tapered nose a small distance from the end of the panel, the fingers associated with the first set of slots being aligned with the second set of slots and vice versa; and the first and second sets of links overlap so that the second set of links engage the fingers of the first set of slots and vice versa to provide a continuous upper surface at the connection of two of the panels.

Preferably the first and second links are formed integrally with, or are hingedly mounted on, the body of the link means.

Preferably the hinge pin means are flexible rods in the panels, adjacent the ends, passing through the first or second sets of slots and the first or second sets of links.

Preferably the flexible rods are of at least semi-flexible polymeric material and are retained in the panels by releasable plugs.

Preferably a ground peg, or an anchor plate with pins, passes through holes in the panels to anchor at least one end of the mat to a supporting surface.

BRIEF DESCRIPTION OF THE DRAWINGS

To enable the invention to be fully understood, a preferred embodiment will now be described with reference to the accompanying drawings, in which:

FIG. 1 is a perspective view of a section of a mat;

FIG. 2 is a top plan view thereof;

FIG. 3 is a sectional side view of a section of the mat, showing two panels in the folded (stored) position.

DETAILED DESCRIPTION OF THE DRAWINGS

Figure 4:
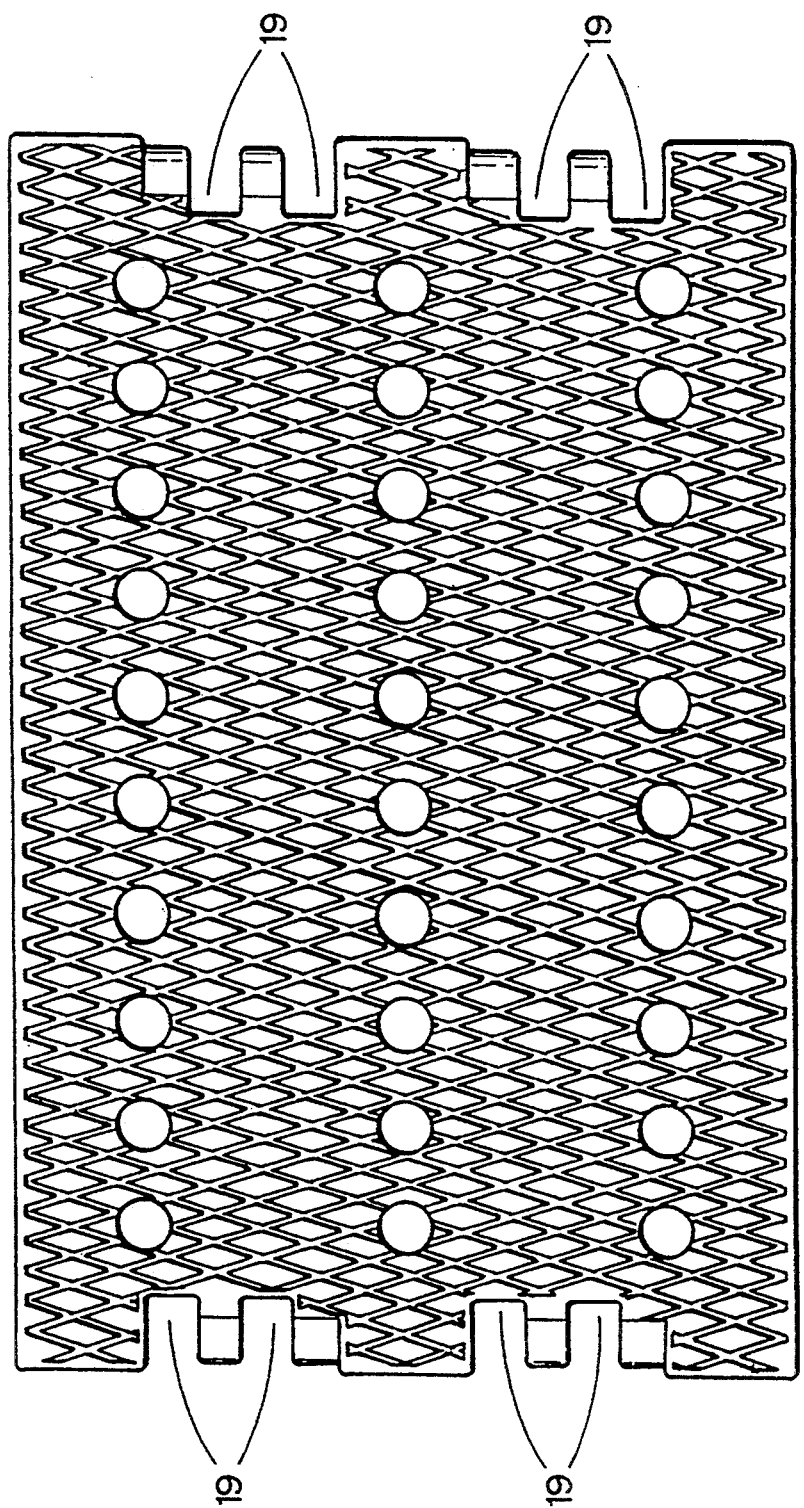
FIG. 4 is a bottom plan view of a panel.

The mat 10 has a plurality of identical panels 11 interconnected by link assemblies 12. A respective mat is provided for the wheels on each side of a vehicle.

Each panel 11 may be cast or moulded in semi-rigid polyurethane or like elastomeric material and has a substantially planar bottom surface 13.

The top surface 14 has transverse traction bars 15 which separate recesses 16 divided by connecting chains 17. Holes 18 are provided centrally in the recesses 16. Pairs of slots 19 are provided at each end of the panels 11 to receive the links 20 of a link assembly 12.

As shown in FIGS. 1 and 2, each panel 11 is connected to two pairs of links 20 in a link assembly via a semi-flexible polymeric rod 21, with the pair of links from the adjacent panels 11 overlapped and connected by a semi-flexible connecting rod 22. Bosses 23 locate the links 20 against transverse movement. As shown in FIG. 2, the rods 21 may be screwed in the panels and the rod 22 in the bosses 23 by plugs 24.

As shown in FIG. 3, the link assemblies 12 allow the panels 11 to be folded one on top of the other into a compact stack.

For de-bogging in mud, the mats are placed under the wheels (after digging) and the other ends are anchored by anchor plates which have 6 pins which are driven through the holes in the first and third rows of the end panel. The vehicles tires will grip on the profiled top surfaces of the panels 11 and the vehicle can be driven free. Ground pressure will force any mud and slush through the holes 18 to prevent the panels 11 from floating.

In soft ground, the panels are inverted and the profiled top surfaces 14 will grip the sand, so as not to be drawn through by the rotation of the vehicle tires, but still providing a solid flat (or patterned) surface (see FIG. 4) for the vehicle tires.

When crossing muddy creeks or the like, two mats can be laid out and anchored at each end to provide drive tracks for the vehicle tires.

In addition to a basic traction mat kit, extra panels 11 and link assemblies 12 may be sold in packs that mats of varying length can be assembled. Each link assembly kit could include eight links 20, three bosses 23, two steel rods 21 and a connecting rod 22.

As the panels 11 are semi-rigid, they will tend to conform with any firm underlying surface as the vehicle's tires pass without cracking or splitting. Should any panels or link assemblies become damaged, they can be easily removed and replaced.

The mats can be designed and manufactured in sizes from small vehicles to large trucks, e.g. for use by Defence forces.

Various changes and modifications may be made to the embodiments described and illustrated without departing from the scope of the present invention defined in the appended claims.

I claim:

1. A traction mat for vehicles including:
   a plurality of substantially planar panels formed of flexible resilient material, each panel having an upper surface engageable by the vehicle's tires, a first set of slots open to one end of the panel and a second set of slots open to an opposite end of the panel, the first and second sets of slots being transversely offset;
   a plurality of link assemblies of flexible material, each link assembly hingedly interconnecting an adjacent pair of the panels and enabling the panels to be folded in a stacked arrangement, each link assembly having a first set of links receivable in the first set of slots on one of the panels and a second set of links received in the second set of slots in a second of the panels; and
   hinge pin means to connect the first and second sets of links to the first and second panels respectively.

2. A traction mat as claimed in claim 1 wherein:
   the flexible resilient material is a semi-rigid polyurethane.

3. A traction mat as claimed in claim 1 wherein:
   the upper surface of each panel has one or more recesses and/or slots to provide a gripping surface for the vehicle's tires;
   a lower surface of each panel is at least partially patterned to provide gripping or non-slip contact with a support surface; and
   one or more holes are provided through the panels to prevent the panels from floating in water or mud.

4. A traction mat as claimed in claim 1 wherein:
   the first and second sets of slots each include two pairs of spaced slots, the slots in each pair alternating with a pair of fingers which are terminated in a tapered nose a small distance from the end of the panel, the fingers alternating with the first set of slots being aligned with the second set of slots and the fingers alternating with the second set of slots being aligned with the first set of slots; and
   the first and second sets of links overlap so that the second set of links engage the fingers of the first set of slots and the first set of links engage the fingers of the second set of slots, to provide a continuous upper surface at the connection of two of the panels.

5. A traction mat according to claim 1 wherein:
   the first and second links are formed integrally with, or are hingedly mounted on, the body of the link means.

6. A traction mat according to claim 1 wherein:
   the hinge pin means are flexible rods in the panels, adjacent the ends, passing through the first or second sets of slots and the first or second sets of links.

7. A traction mat as claimed in claim 1 wherein:
   the flexible rods are of at least semi-flexible polymeric material and are retained in the panels by releasable plugs.

8. A traction mat as claimed in claim 1 wherein:
   a ground peg, or an anchor plate with pins, is passed through holes provided in the panels to anchor at least one end of the mat to a supporting surface.

* * * * *